United States Patent [19]

Everburg

[11] 4,026,640
[45] May 31, 1977

[54] TENNIS PLAYERS' SPECTACLES

[75] Inventor: Donald E. Everburg, Southbridge, Mass.

[73] Assignee: American Optical Corporation, Southbridge, Mass.

[22] Filed: Aug. 5, 1976

[21] Appl. No.: 711,943

Related U.S. Application Data

[63] Continuation of Ser. No. 573,191, April 30, 1975, abandoned.

[52] U.S. Cl. .............................. 351/120; 351/94; 351/119; 351/123; 351/130; 351/137
[51] Int. Cl.[2] ...................... G02C 5/14; G02C 5/02
[58] Field of Search ............. 351/92, 94, 119, 120, 351/123, 130, 136, 137

[56] References Cited

UNITED STATES PATENTS 1,784,013  12/1930  Kern .............................. 351/137 X
1,967,434  7/1934  Simonds ......................... 351/94 X Primary Examiner—Paul A. Sacher
Attorney, Agent, or Firm—H. R. Berkenstock, Jr.; William C. Nealon

[57] ABSTRACT

A pair of spectacles having a lightweight frame structure especially designed with unusual pantoscopic tilt in combination with rocking-pad nasal support affording minimal facial contact and cable temple ends adapted to intimately engage and extend about a large portion of the ear for sureness of continued proper fit of the spectacles upon the face during pursuance of the sport of tennis.

1 Claim, 4 Drawing Figures

TENNIS PLAYERS' SPECTACLES

This is a continuation, of now abandoned application Ser. No. 573,191 filed Apr. 30, 1975.

BACKGROUND OF THE INVENTION

1. Field of the Invention:

This invention relates in general to eyeglasses and has particular reference to a pair of spectacles peculiarly designed for use in conjunction with the sport of tennis.

2. Discussion of the Prior Art:

In pursuance of the sport of tennis, whether indoors or out, there is commonly the need or desire for the protection and/or visual assistance which can be afforded by sports eyeglasses. All too often, however, eyeglass protection is avoided because of the uncomfortableness or ungainliness of conventional sports glasses or ordinary street wear spectacles are relied upon when ophthalmic correction is an absolute necessity.

While sports glasses and goggles are available in various shapes, sizes and types, e.g. for skiers, baseball and football players, racing drivers and others, their usual ungainliness in size, weight and/or various restrictivenesses of design to accommodate for the particular sport have been responsible for the hitherto large scale turning away from sports eyeglass protection by tennis players.

Tennis playing, in requiring exceptional alertness and consequently minimal distraction from weighty and insecure or otherwise ill-fitting spectacles has been in need of securely mountable lightweight spectacles offering minimal obstruction of peripheral vision and/or blurring of forward vision by perspiration smearing of their lenses. The latter results primarily from conventional frame front contact with the brow and/or other portions of the face and the former from ungainly lens supporting frame structures. Both are avoided by the present invention.

Accordingly, a principal object of the invention is to provide lightweight, comfortable and securely fittable spectacles which overcome the aforesaid and related drawbacks of prior art sports glasses and wherewith tennis players may enjoy with comfort the advantages of visual assistance and protection obtainable with sports eyeglasses.

Other objects and advantages of the invention will become apparent as this specification progresses.

SUMMARY OF THE INVENTION

The aforesaid objects and corollaries thereof are accomplished by the provision of a lightweight spectacle frame formed of thin, preferably metallic, components all designed and assembled to provided the frame with lens rims and bridge portions adapted to be positioned away from and maintained out of contact with the brow, cheeks and all other portions of an intended wearer's face. This prevents perspiration from reaching the spectacle front and more particularly from reaching and smearing the lenses thereof. The frame front is disposed at an unusual pantoscopic tilt away from a wearer's brow and positioned forwardly of the nose with rocking pads making the only facial contact.

Design of the spectacles further includes temple ends each comprised of a smooth flexible cable which may be readily preshaped for precise fitting about the ear. The cable is of such a length as to be extendable intimately about a substantial portion of the rear of the external ear and is terminated with a reverse bend to prevent uncomfortable indentation of the ear. By such means, highly effective holding of the spectacles in place upon the face of a wearer is accomplished regardless of the extent, direction and/or abruptness of movement of the head, i.e. as may take place during the vigorousness of tennis playing.

The frame structure is of minimal bulk having its endpieces (temple connections) above the level of the eye for substantially unobstructed sidewise vision during use.

Protecton against various amounts and types of reflected glare and/or excessive brightness may be obtained by selecting lenses of appropriate types, colors and optical densities for use in the spectacles. Lenses which have been stained or otherwise provided with a light yellow coloring having an overall 85 to 90 percent transmission and an approximately 50 percent transmission at about 415 nanometers have been found to produce pleasing results.

Details of the invention will become more readily apparent from the following description when taken in conjunction with the accompanying drawings.

IN THE DRAWINGS

DESCRIPTION OF THE PREFERRED EMBODIMENTS

Figure 1:
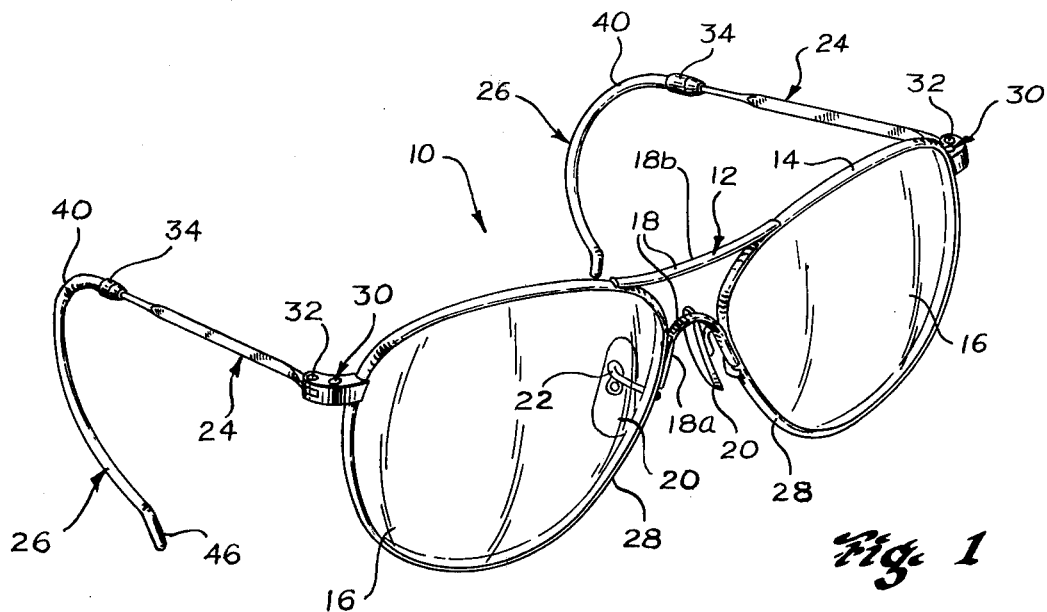
FIG. 1 depicts, in perspective, a preferred embodiment of the invention.
Figure 2:
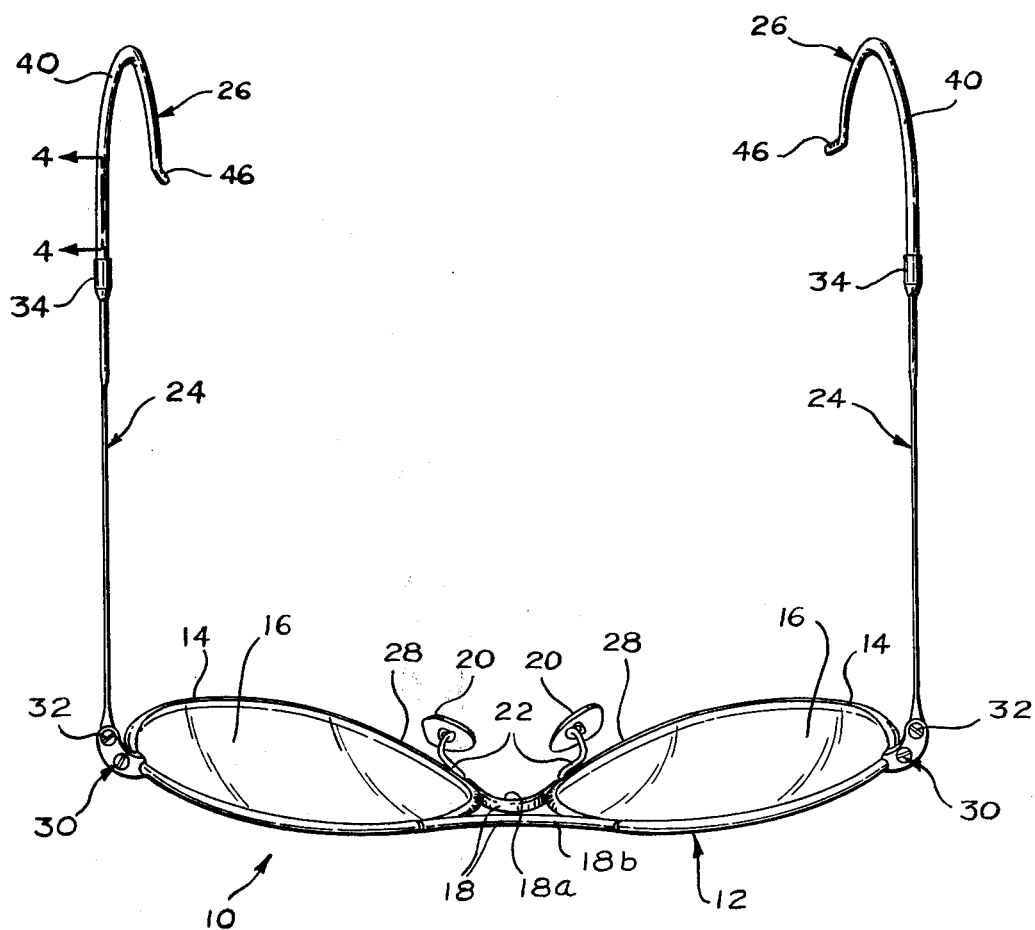
FIG. 2 is a top plan view of the spectacles illustrated in FIG. 1.

Referring more particularly to the drawings, spectacles 10 comprise frame front 12 including a pair of lens rims 14 which hold lenses 16 in place, a double bar bridge 18 integrating the rims 14, rocking pads 20 and pad supporting arms 22 for use in resting front 12 upon the nose of a wearer and temples 24 with cable ends 26 for securing the spectacles in a position of use.

With the aim of minimizing weight and bulkiness of spectacles 10 but without sacrifice of sturdiness, the aforementioned components, excepting pads 20 and coverings for temple ends 26, are preferably, but not necessarily, formed of metal (e.g. a copper-nickel alloy). The pads 20 and temple end coverings are preferably formed of a plastic material (e.g. cellulose acetate butyrate) for comfort of fit and wearing against the skin. Thus, they are by nature relatively light in weight, adding only negligibly to the total weight of spectacles 10.

In order to further minimize the weight of spectacles 10, it is proposed that lenses 16 be formed of a cast resin such as allydiglycolcarbonate rather than glass. Such lenses are not only light in weight but highly resistant to breakage and adaptable to coloring for accomplishing certain light filtering and brightness reduction properties. Tinting with a yellow dye to the extent of reducing a lens overall luminous transmittance to within 85 to 90 percent with an approximate 50 percent transmission at about 415 nanometers has been found to produce pleasing results.

Such a lens may be surface coated for enhanced abrasion resistance and/or resistance to fogging.

It should be understood, however, that glass lenses may be used, if desired.

Peculiarities of the spectacles 10 structure which have solved the prior art problems discovered by this inventor as needing to be overcome for tennis playing are the following:

In addition to the aforesaid features of lightness of weight and sturdiness of materials used, lens rims 14 are preferably dimensioned to accommodate lenses 16 of relatively large size. Lens sizes of from 54 to 60 mm are contemplated.

Nasal portions 28 of rims 14 are widely separated to prevent their contact with the nose or adjacent portions of the face of an intended wearer.

Bridge 18 comprises a lower arcuate section 18a forming the main supporting interconnection of rims 14. Section 18a is so located as to be completely out of contact with a wearer's nose. Brow bar 18b provides reinforcement.

It is to be understood that all parts of spectacles 10 are permanently joined together either by soldering, cementing, screws and/or rivet-like connections, whichever is most appropriate at is particular point in the spectacles construction.

Rocking pad arms 22 extend an exceptional distance rearwardly of frame front 12 to assure that front 12 will be maintained out of contact with all portions of a wearer's face; rocking pads making the only contact.

Endpieces 30 are of the split type wherewith, as it is well-known in the art, lens rims 14 may be opened to receive lenses 16 and thence clamped together, e.g. with a screw, to retain the lenses in place. Rims 14 are internally grooved to guard against lens displacement. Endpieces 30 further function as the stationary portion of temple hinge 32. Hinge 32 is of the "three barrel" type for lightness of weight and simplicity of structure. Its intermediate barrel is the proximal end of temple 24 in each case. Each temple is pivotable about a hinge screw of conventional construction threaded into the lowermost hinge barrel.

Figure 3:
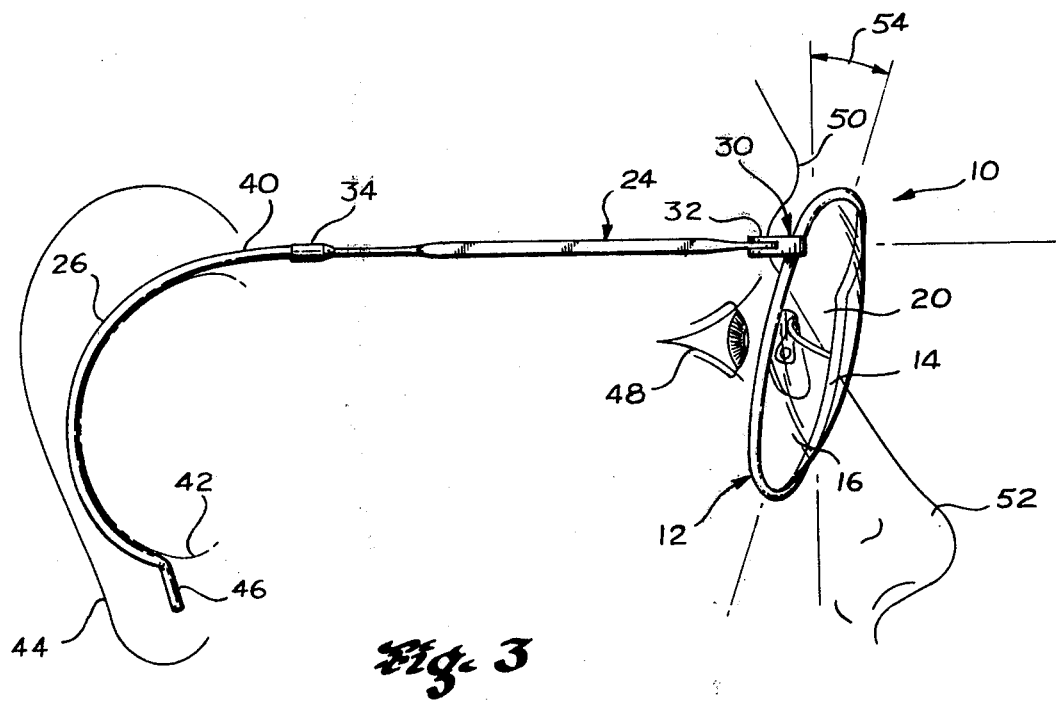
FIG. 3 is a side elevational view of the same spectacles but illustrated in a position of use.
Figure 4:
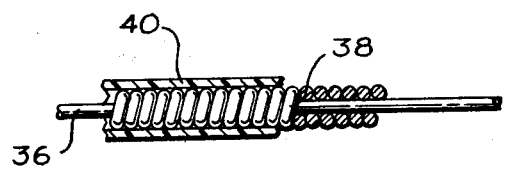
FIG. 4 is an enlarged fragmentary cross-sectional view taken along line 4—4 of FIG. 2.

Oppositely of hinge 32, each temple 24 is provided with a ferrule within which is secured cable 26 of the temple. A typical cable 26 construction may comprise a core of malleable wire, e.g. wire 36 (FIG. 4), along which is wound a continuous relatively thin second wire 38 covered with a plastic sheath 40. By such means, the cable 26 of each temple 24 may be preformed to fit precisely and comfortably about the root 42 of the pinna of an intended wearer's ear 44 as illustrated in FIG. 3. The end 46 of each cable is provided with a reverse bend to prevent uncomfortable endwise contact with the wearer's ear.

Referring more particularly to FIG. 3, it can be seen that endpieces 30 are disposed well above a wearer's eye 48 so that lateral vision is unobstructed. Additionally, and specifically for purpose of preventing contact of any portion of frame front 12 with the wearer's brow 50, front 12 is disposed at an unconventional pantoscopic angle 54 of from 12° to 15°.

From the foregoing description, it can be seen that the objective of lightness in weight and sturdiness of structure has been accomplished by the thin, generally wire-like frame construction which, with temple cables 26, offers secureness of fit upon a wearer's head with an assurance against displacement regardless of the extent, direction and/or abruptness of movement of the head. Lens smearing by perspiration is prevented by relatively severe pantoscopic tilting of frame front 12 away from a wearer's brow and an unusual spacing of front 12 forwardly of the face by rocking pad arms 22. The reverse bending of ends 46 of temple cables 26 and high disposition of endpieces 30 upon rims 14 are further contributory to the uniqueness of the spectacles structure hereinabove described.

I claim:

1. A pair of spectacles comprising the combination and particular arrangement of:

a lightweight frame front including a pair of slender lens rims interconnected by a bridge having a lower correspondingly slender and similarly shaped smoothly rounded inverted U-shaped main component and a reinforcing downwardly curved brow bar spaced a substantial distance above said main component of said bridge, a rocking pad arm extending rearwardly and thence downwardly from each rim adjacent said bridge and terminating with a broadened nosepad receiving end at a substantial distance rearwardly of said bridge, a nose-engaging rocking pad loosely pivotally connected to said end of each of said arms for supporting said frame front upon the nose of a wearer at a substantial distance forwardly of adjacent portions of the wearer's face;

a pair of temples, one hingedly connected to each of said rims adjacent the respective uppermost portions thereof oppositely of the lowermost portion of said brow bar, an elongated distally disposed sheathed cable ferruled to each of said temples and terminally reversely bent for use in intimately and comfortably fitting the spectacles to the ears of a wearer; and said frame front being disposed at an unusually severe pantoscopic tilt of greater than 12° relative to said temples for completely avoiding contact of said front with a wearer's brow and face, excepting the contact made by said rocking pads and cables.

* * * * *